Aug. 10, 1965 R. H. BANGERT 3,200,349
CRYSTAL CONTROLLED OSCILLATOR WITH TEMPERATURE COMPENSATION
Filed Feb. 5, 1963
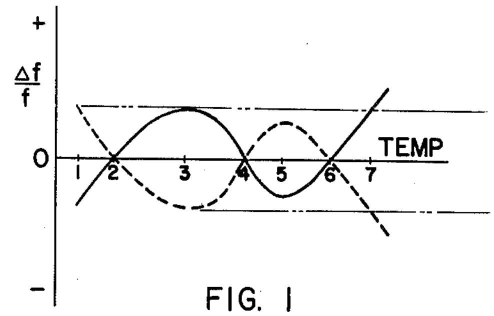
FIG. 1
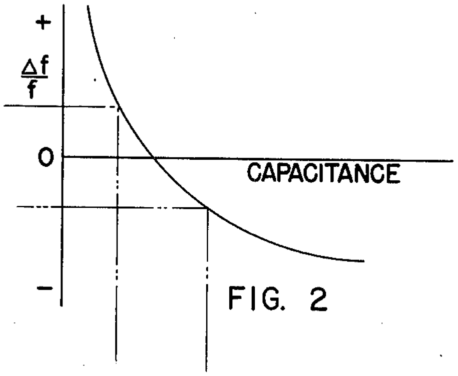
FIG. 2
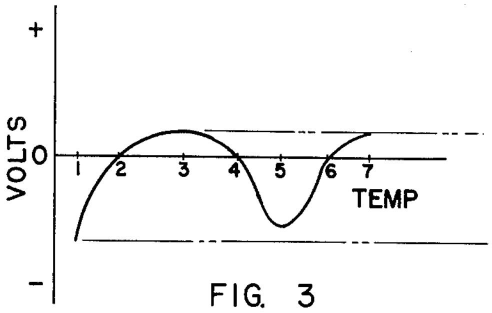
FIG. 3
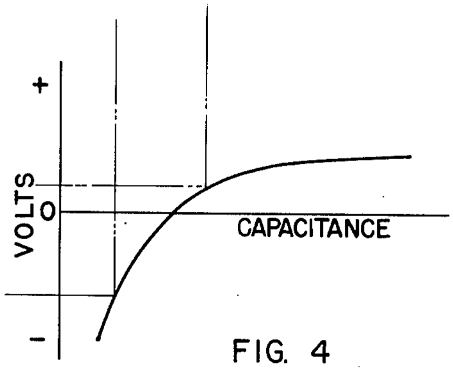
FIG. 4
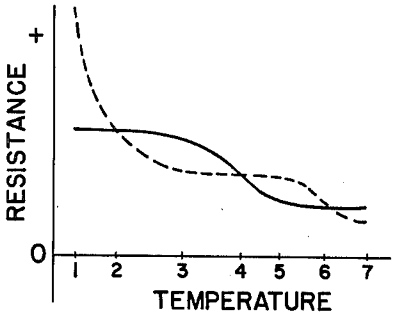
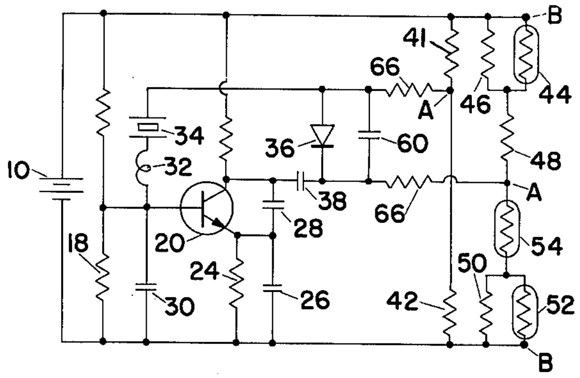
FIG. 6 FIG. 5

United States Patent Office 3,200,349
Patented Aug. 10, 1965

3,200,349

CRYSTAL CONTROLLED OSCILLATOR WITH TEMPERATURE COMPENSATION

Richard H. Bangert, Davenport, Iowa, assignor to The Bendix Corporation, Davenport, Iowa, a corporation of Delaware Filed Feb. 5, 1963, Ser. No. 256,284
1 Claim. (Cl. 331—116)

This invention relates to frequency control of crystal oscillators.

It is a criteria for sustained oscillation in electric oscillators that the algebraic sum of the reactances around the oscillatory circuit be equal to zero. If, in a crystal oscillator, the reactance exhibited by a crystal at its frequency of oscillation is changed as an incident to temperature change, then the frequency of oscillation must change in that degree required to return the algebraic sum of reactance to zero, or the reactance elsewhere on the oscillatory circuit must be altered by an amount equal but opposite to the change in reactance of the crystal. The invention is advantageously employed to accomplish frequency control in the latter sense by maintaining oscillator frequency constant despite temperature change. Accordingly, the invention will be described particularly in relation to temperature compensation of oscillators.

In the case of AT-cut, and similarly cut, crystals, frequency deviation varies approximately as the third power of temperature such that zero deviation occurs at approximately 25 degrees centigrade. For certain cuts, zero deviation occurs at 3 different temperatures whereby the problem of providing temperature compensation is rendered difficult.

It is one object of the invention to provide temperature compensation for oscillators employing crystals of a type, particularly AT-cut crystals, in which the relationship between oscillation frequency and temperature is complex.

These objects are realized in part by the provision in the invention of a semi-conductor junction, which exhibits electrical impedance variable in degree with the magnitude of unidirectional voltage impressed across the junction, together with the means including an electrical bridge circuit for impressing across the junction a unidirectional voltage variable in magnitude with temperature.

These and other objects and advantages of the invention will be apparent in the accompany description of the embodiment shown in the accompanying drawing. It is to be understood that various modifications may be made in the embodiment selected for illustration and that other embodiments of the invention are possible without departing from the spirit of the invention or the scope of the appended claim.

In the drawings:

FIG. 1 is a graph showing the relationship between frequency deviation, compensation required, and temperature in a crystal cut within the range of AT-cut angles;

FIG. 2 is a graph of the relationship between frequency deviation and capacitance for an oscillator in which the capacitance of the graph exhibits reactance in the oscillatory circuit;

FIG. 3 is a graph of the relationship between the voltage applied across a semiconductor junction and the capacitance exhibited by that junction;

FIG. 4 is a curve, derived from FIGS. 1, 2, and 3 of the relationship between the voltage to be applied across a semiconductor junction and temperature required to overcome the frequency deviation with temperature depicted in FIG. 1.

FIG. 5 is a circuit diagram of a crystal oscillator embodying the invention; and FIG. 6 is a graph of the relationship between temperature and the resistance of portions of the circuit of FIG. 5 necessary to produce a compensating voltage variable with temperature in the manner depicted in FIG. 4.

The oscillator shown in FIG. 5 comprises a source of unidirectional power 10 connected across a positive line 12 and a negative line 14. A voltage divider comprising the series combination of resistors 16 and 18 connected between lines 12 and 14 is connected at the junction point of the resistors to the base of a transistor 20. The collector of the transistor is connected to line 12 by a load resistor 22. The emitter of the transistor is connected to negative line 14 through the parallel combination of a bias resistor 24 and base capacitor 26. In addition to the transistor itself, the oscillatory circuit comprises a capacitor 28 connected between the transistor's collector and emitter; a capacitor 30 connected from the base to negative line 14; and the series circuit combination between the transistor base and collector of an inductor 32; a piezoelectric crystal 34; a semiconductor junction, which in this embodiment comprises a diode 36; and a blocking capacitor 38.

Means are provided for altering the reactance in the oscillatory circuit as a function of temperature. This means comprises means for varying a unidirectional potential applied across the semiconductor junction. Advantageously, as shown, it comprises a bridge circuit having a temperature sensitive resistance in at least one of its legs and including means for connecting one of two diagonals across the semiconductor junction and the other of its diagonals across the source of unidirectional electrical power. In FIGURE 5 the bridge is formed by a resistor 41 in a first leg, a resistor 42 in a second leg, the parallel combination of resistors 44 and 46 in series with resistor 48 in a third leg, and the parallel combination of resistors 50 and 52 in series with a resistor 54 in the fourth leg of the bridge. Resistors 44, 50, and 54 have resistance values that vary materially with temperature. One diagonal of this bridge, comprising the terminals AA is connected across diode 36 through current limiting resistor 66. The other diagonal of the bridge, comprising the terminals BB, is connected across positive and negative lines 12 and 14.

The crystal represented by the symbol numbered 34 in FIG. 5 is cut such that it falls within the range of AT cuts. The solid curve in FIG. 1 shows the relationship between frequency deviation and temperature in such a crystal. Frequency deviation is defined as the difference in cycles per second between actual and desired frequency all divided by desired frequency. The dashed curve in FIG. 1 is the inverse of the solid curve so it represents, in terms of frequency deviation, the required compensation. The numerals on the temperature scale in FIG. 1 represent temperatures at which the curve passes through zero or maximum or minimum values. The curve of FIG. 2 depicts the frequency deviation that would result with change in capacitance in the oscillatory circuit of FIG. 5. The curve of FIG. 3 illustrates how the capacitance exhibited by diode 36 in FIG. 5 varies with the unidirectional voltage applied across that diode. The dashed lines interconnecting the dashed curve of FIG. 1 and the curve of FIG. 2 define the range through which capacitance in the oscillatory circuit of FIG. 5 must change to compensate for a change in temperature from temperature 1 to temperature 7 in FIG. 1. The dashed lines connecting FIGS. 2 and 3 define the range through which the voltage applied across diode 36 would be changed to accomplish a change in capacitance sufficient to overcome the frequency deviation that would otherwise result from a change from temperature 1 to temperature 7.

FIG. 4 is derived from FIGS. 1 and 2, it shows the voltage variation defined by FIG. 3 plotted against the temperature variation defined by FIG. 1. It shows, for any temperature between temperatures 1 and 7, the voltage that must be applied across diode 36 to make that diode exhibit an amount of capacitance which will result in a frequency change which will overcome the deviation that would occur in the absence of such compensation.

Like the frequency deviation and temperature of FIG. 1, the voltage and temperature are related in FIG. 4 by a cubic equation. Prior attempts to compensate crystal oscillators for changes in temperature have been limited to compensation over only a portion of this temperature range or were otherwise inadequate. Employment of this bridge circuit makes it possible to provide a voltage whose magnitude is the cube of temperature for better compensation over a wider temperature range. Moreover, use of circuits including D.C. blocking means, of which FIGURE 5 is an example, permit unidirectional voltage control of frequency without disturbing the transistor bias potentials.

While not limited to the use of temperature sensitive resistors of that kind, resistors 44, 50, and 54 advantageously are the kind whose resistance decreases as a power function of temperature rise. If resistor 46 has a value exceeding the resistance of resistor 44 at temperatures below temperature 3, and if resistor 48 has a low value relative to resistor 46, then the combination of resistors 44, 46, and 48 will exhibit a total resistance which will vary with temperature substantially as indicated by the solid line in FIG. 6. If resistor 52 has a value which is substantially equal to the value of resistor 50 at temperature 5, and if resistor 54 has a resistance materially less than resistor 50, then the total resistance of the combination of resistors 50, 52, and 54 will vary substantially as shown by the dashed lines in FIG. 6. If the product of the resistance of resistor 40 times the combined resistance of resistors 50, 52, and 54 equals the product of resistor 42 times the combined resistance of resistors 44, 46, and 48 is equal at temperature 2, then the solid and dashed curves of FIG. 6 will be related to one another substantially as shown in that figure. The dashed line falls below the solid line when the voltage applied across diode 36 is to be negative and it falls above the solid line when that voltage is to be positive.

The foregoing description has not taken into account the fact that a capacitor 60 is shown in FIG. 5 to be connected across the diode 36. This capacitor may be omitted and the circuit will operate as hereinbefore described. However, the resistance exhibited by a semiconductor junction as well as its capacitance is altered when the voltage across such a junction is changed. In certain applications of the invention it is desirable to connect a capacitor in parallel with the diode. When this is done, the effectiveness of that capacitor to exhibit capacitive reactance having an effect upon oscillatory frequency will vary with changes in unidirectional voltage across the diode because such voltage changes change the resistance of the diode and the proportion of oscillatory current which is bypassed around the capacitor 60 through the resistance of the diode. In operation of the circuit shown, as the temperature of the crystal is changed, its reactance is changed. Since reactance must add to zero in order that oscillations be sustained, the crystal tends to change oscillation frequency to a value where the reactance it exhibits would once more be equal and opposite to that of the remainder of the circuit. However, the temperature change applied to the crystal being applied also to the bridge circuit, results in modification of bridge circuit values and application of unidirectional voltage across diode 36 such that the reactance of the oscillatory circuit external to the crystal is modified by an amount substantially equal and opposite to the impedance change of the crystal whereby oscillation frequency remains substantially unchanged.

I claim:

A temperature compensated, crystal controlled electric oscillator comprising:

(a) a piezoelectric crystal;
(b) a semiconductor junction the impedance of which is variable with the magnitude of unidirectional voltage applied thereacross;
(c) a transistor;
(d) a blocking capacitor;
(e) an oscillatory circuit including the series circuit combination of said crystal, said semiconductor junction, said blocking capacitor and one junction of said transistor arranged such that said semiconductor junction is connected intermediate said crystal and said blocking capacitor;
(f) an electric bridge comprising four legs defining two sets of bridge diagonals and in which at least two legs of said bridge comprise the parallel combination of a substantially fixed resistor and one whose resistance varies with temperature and in which one of said two legs further comprises an additional resistor whose resistance varies with temperature connected in series circuit with said parallel combination;
(g) means for connecting one set of diagonals to a source of unidirectional electrical power; and
(h) means for connecting the other set of diagonals across said semiconductor junction.

References Cited by the Examiner

UNITED STATES PATENTS 3,054,966 9/62 Etherington ---------- 331—176

FOREIGN PATENTS 811,095 4/59 Great Britain.

ROY LAKE, *Primary Examiner.*

JOHN KOMINSKI, *Examiner.*